United States Patent
Kimura

(10) Patent No.: US 6,400,909 B1
(45) Date of Patent: Jun. 4, 2002

(54) APPARATUS ADAPTED TO PHOTOGRAPHIC FILM HAVING MAGNETIC RECORDING PART

(75) Inventor: Fumio Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/217,602

(22) Filed: Dec. 21, 1998

(30) Foreign Application Priority Data

Dec. 24, 1997 (JP) .............................................. 9-365956

(51) Int. Cl.⁷ .............................................. G03B 17/24
(52) U.S. Cl. ........................................ 396/312; 396/319
(58) Field of Search ................................. 396/312, 319

(56) References Cited

U.S. PATENT DOCUMENTS 5,530,501 A * 6/1996 Bell ............................ 396/312
5,634,158 A * 5/1997 Shon et al. .................. 396/320

* cited by examiner

*Primary Examiner*—David M. Gray
(74) *Attorney, Agent, or Firm*—Robin, Blecker & Dale

(57) ABSTRACT

In an apparatus adapted to a photographic film having a magnetic recording part, a magnetic recording device continuously records magnetic information on an area of the photographic film extending from a leader part thereof to inside an image recording area thereof.

3 Claims, 17 Drawing Sheets

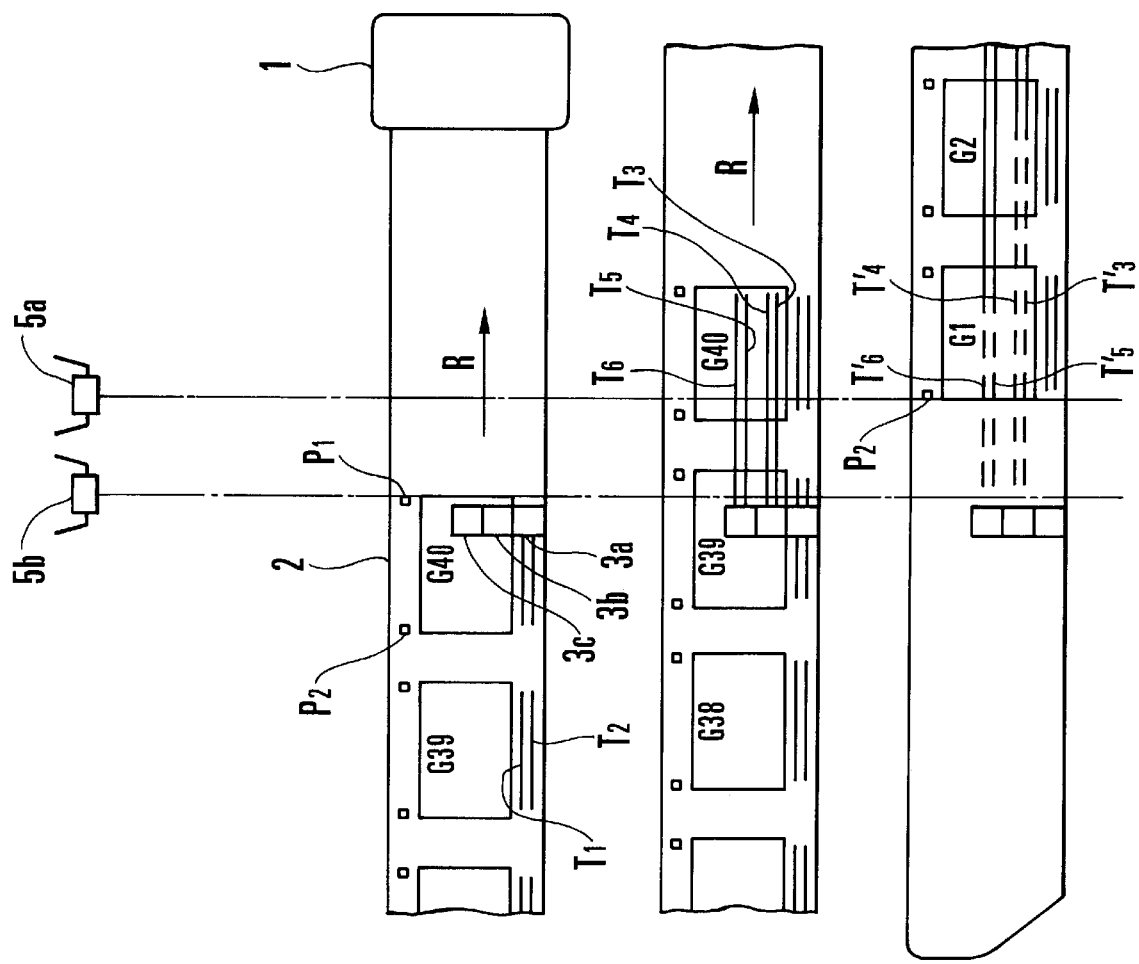

FIG. 15

| | TRACK T3: FRAME INFORMATION | TRACK T4: TEXT INFORMATION | TRACK T5: SOUND INFORMATION |
|---|---|---|---|
| a | F(1) – T(1) | T(1) – "IN_THE_FIRST_SNOWFALL" | S(1) – "YO-HO YO-HO" |
| b | F(2) – T(1), S(1) | T(2) – "AT_BIRTHPLACE" | S(2) – "BOAH" |
| c | F(5) – S(2) | T(3) – "HAPPY_BIRTHDAY" | S(3) – "CHEERS" |
| d | F(7) – S(3) | END SIGNAL | S(4) – "POP POP POP" |
| e | F(11) – T(3), S(4) | | END SIGNAL |
| f | F(18) – S(4) | | |
| g | F(19) – S(4), ZU | | |
| h | F(22) – S(5) | | |
| i | END SIGNAL | | |

APPARATUS ADAPTED TO PHOTOGRAPHIC FILM HAVING MAGNETIC RECORDING PART

BACKGROUND OF THE INVENTION

1. Field of the Invention

The present invention relates an improvement on an apparatus such as a camera capable of performing magnetic recording on a photographic film having a magnetic recording part.

2. Description of Related Art

In recent years, there have been proposed cameras capable of recording information related to photography (for example, a photo-taking mode, the number of prints, a shutter speed, an aperture value, etc.) in a magnetic recording part provided on a photographic film, as disclosed in U.S. Pat. No. 4,864,332, etc. With the magnetic recording performed on a photographic film by such a camera, various kinds of magnetic information are reproduced by a photo-finishing machine from the magnetic recording part of the film, and then, photographs are printed by the photo-finishing machine according to such reproduced information.

In addition, in U.S. Pat. No. 5,276,472, there is disclosed the technical art of recording an audio signal in a magnetic recording part of a photographic film at such an area that coindides with the inside of an image frame area of the photographic film.

Further in Japanese Laid-Open Patent Application No. Hei 09-106000, there has been proposed a device capable of recording various kinds of information, such as photo-taking information, a frame title, other messages, sounds, etc., related to an image frame, in a plurality of parallel tracks which are formed on a magnetic recording part of a photographic film and which extend in the longitudinal direction of the film strip across image frames.

However, in the devices proposed in the above-mentioned U.S. Pat. Nos. 4,864,332 and 5,276,472, since magnetic information is recorded in any one of a plurality of tracks each of which has a start point and an end point within the area of every image frame of a photographic film, only a short period of sound recording time can be provided if a sound or the like is desired to be recorded for one frame.

Further, in the device proposed in the above-mentioned Japanese Laid-Open Patent Application No. Hei 09-106000, while magnetic information is recorded in a plurality of parallel tracks on a magnetic film across a plurality of image frames, the respective start points of the magnetic information are limited to such positions that respectively correspond to the plurality of image frames. Therefore, if a great amount of data is intended to be recorded, the recording capacity of every one of all the frames has to be increased, whereby wasteful areas may be produced. Besides, in order to search recorded data, all the tracks always has to be scanned, so that a long time is required for taking in data.

BRIEF SUMMARY OF THE INVENTION

In accordance with one aspect of the invention, there is provided an apparatus adapted to a photographic film having a magnetic recording part, which comprises a magnetic recording device which continuously records magnetic information on an area of the photographic film extending from a leader part thereof to inside an image recording area thereof, so that a greater amount of magnetic information can be recorded on the photographic film.

The above and other aspects of the invention will become apparent from the following detailed description of preferred embodiments thereof taken in conjunction with the accompanying drawings.

BRIEF DESCRIPTION OF THE SEVERAL VIEWS OF THE DRAWING

FIGS. 4(A) to 4(C) are diagrams for explaining a first example of case where the magnetic recording is being performed in an area of the film extending from a leader part thereof to the track position of an image recording area thereof by the camera according to the first embodiment.

FIG. 15 is a diagram showing various examples of magnetic information to be recorded on a film by the film image reproducing apparatus according to the second embodiment.

DETAILED DESCRIPTION OF THE INVENTION

Hereinafter, preferred embodiments of the invention will be described in detail with reference to the drawings.

FIGS. 1 to 11 relate to a camera according to a first embodiment of the invention.

Figure 1:
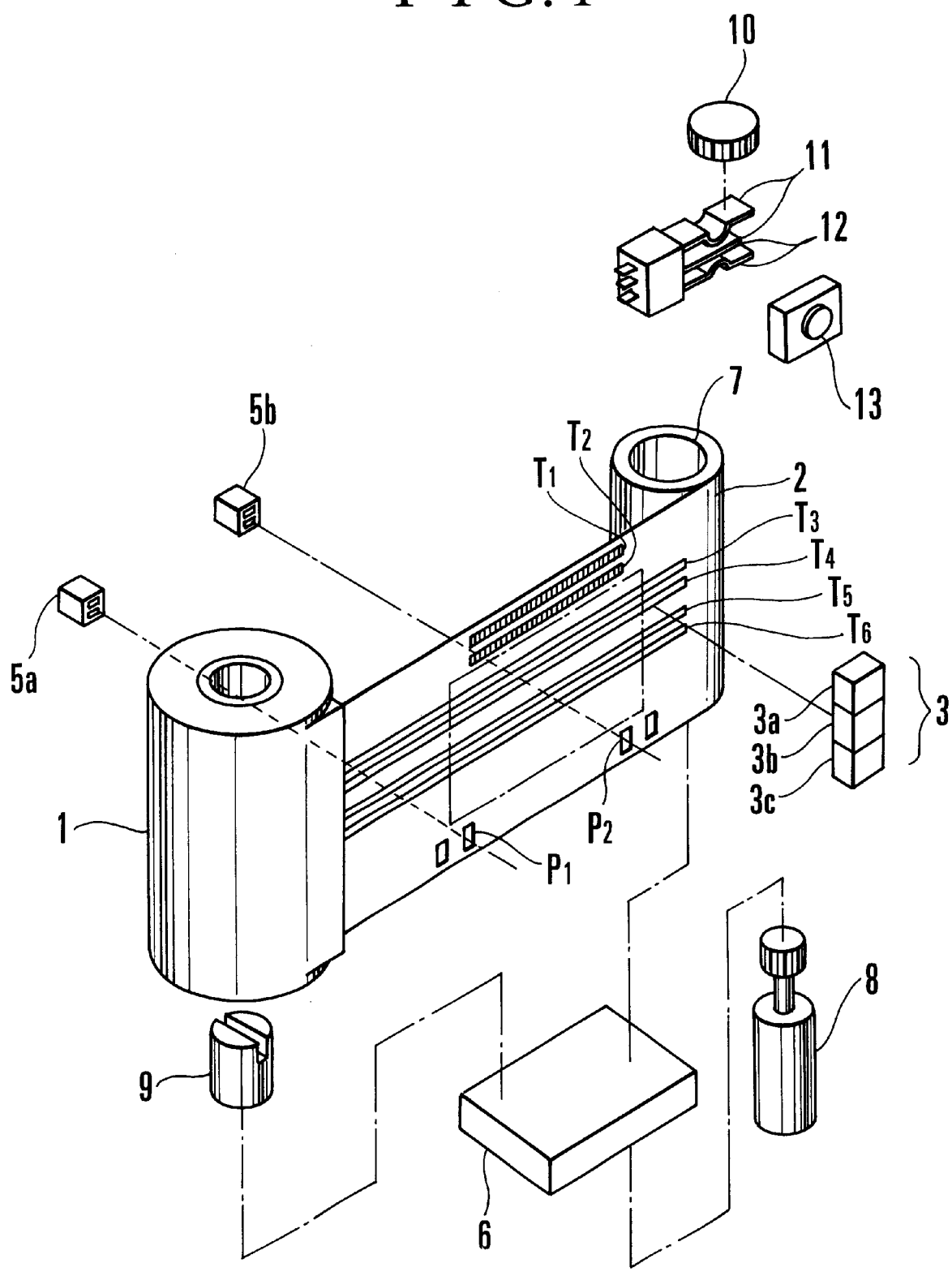
FIG. 1 is an exploded perspective view showing mechanical elements of a camera according to a first embodiment of the invention.

Referring to FIG. 1, which is an exploded perspective view showing a film transport system of the camera, reference numeral 1 denotes a thrust-type film cartridge (hereinafter, referred to simply as cartridge), and reference numeral 2 denotes a photographic film having a magnetic recording part. The magnetic recording part of the film 2 is composed of tracks $T_1$ and $T_2$ which are formed along a side edge part of each frame and tracks $T_3$ to $T_6$ which are formed continuously extending from a leader part of the film 2 to inside an image recording area thereof. Reference numeral 3 denotes a magnetic head array which is arranged to come into sliding contact with the tracks $T_1$ to $T_6$ of the film 2 to write and read information in and from the tracks $T_1$ to $T_6$. In the case of the first embodiment shown in FIG. 1, the magnetic head array 3 is composed of three magnetic heads 3a, 3b and 3c, each of which has two channels.

The film transport system of the camera shown in FIG. 1 includes photo-reflectors 5a and 5b for detecting perforations $P_1$ and $P_2$ of the film 2 to generate signals for indexing one frame of the film 2 and for controlling the start of magnetic recording and the end of magnetic recording, a gear train 6 having a known gear arrangement for the film transport system, a film take-up spool 7, a film transport motor 8 disposed inside the film take-up spool 7 to drive the gear train 6, a rewinding fork 9 arranged to engage the spline of a supply spool provided within the cartridge 1 to drive the supply spool, a release button 10, a switch 11 (SW1) for starting light-measuring and distance-measuring operations, a switch 12 (SW2) for starting the sequence of shutter-opening and film-transporting operations, and a rewinding switch 13 for performing a halfway rewinding of the film 2.

Figure 2:
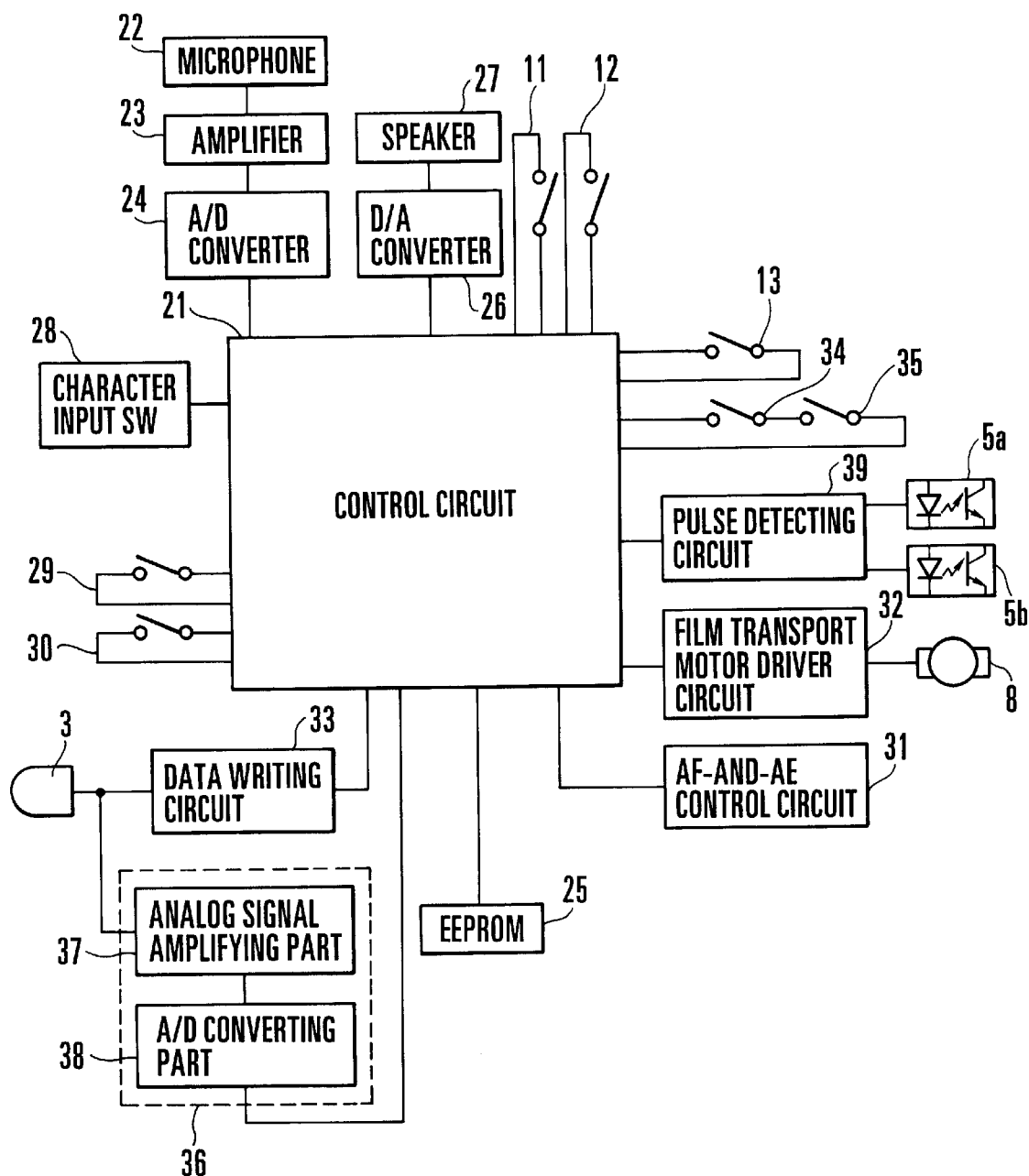
FIG. 2 is a block diagram showing the circuit arrangement of the camera according to the first embodiment.

FIG. 2 is a block diagram showing the circuit arrangement of the camera having the film transport system as configured in the above manner. In FIG. 2, parts which are the same as those shown in FIG. 1 are respectively denoted by the same reference numerals.

Referring to FIG. 2, a control circuit 21 is composed of a microcomputer, etc. The output of a microphone 22 is supplied through an amplifier 23 to an A/D converter 24 to be converted into a digital signal. The digital signal outputted from the A/D converter 24 is stored in an EEPROM 25 through the control circuit 21. Also, the data stored in the EEPROM 25 is supplied through the control circuit 21 to a D/A converter 26 to be converted into an analog signal, which is then supplied to a speaker 27. To the control circuit 21 are connected a character input switch 28 for selecting and inputting a character, a sound input switch 29 and a sound reproducing switch 30.

To the control circuit 21 are connected an AF-and-AE control circuit 31 for controlling the focusing of a photo-taking lens and the operation of an exposure controlling shutter, a film transport motor driver circuit 32 for driving the film transport motor 8, a data writing circuit 33 for driving and causing the magnetic heads 3a to 3c of the magnetic head array 3 to perform an information writing operation, a cartridge detecting switch 34 arranged to be turned on by the loading of the cartridge 1 into the camera, and a cartridge lid switch 35 arranged to be turned on by the closing of a cartridge chamber lid (not shown). When both the switches 34 and 35 are turned on, the control circuit 21 drives the film transport motor 8 through the film transport motor driver circuit 32 to begin the head-finding operation for the first frame of the film 2.

To the control circuit 21 are also connected a magnetic reading circuit 36 composed of an analog signal amplifying part 37 for detecting and amplifying output signals from the magnetic heads 3a to 3c of the magnetic head array 3 and an A/D converting part 38 for converting the amplified signals into digital signals, and a pulse detecting circuit 39 for converting the signals detected by the photo-reflectors 5a and 5b into signals conforming to the control circuit 21.

Figure 8:
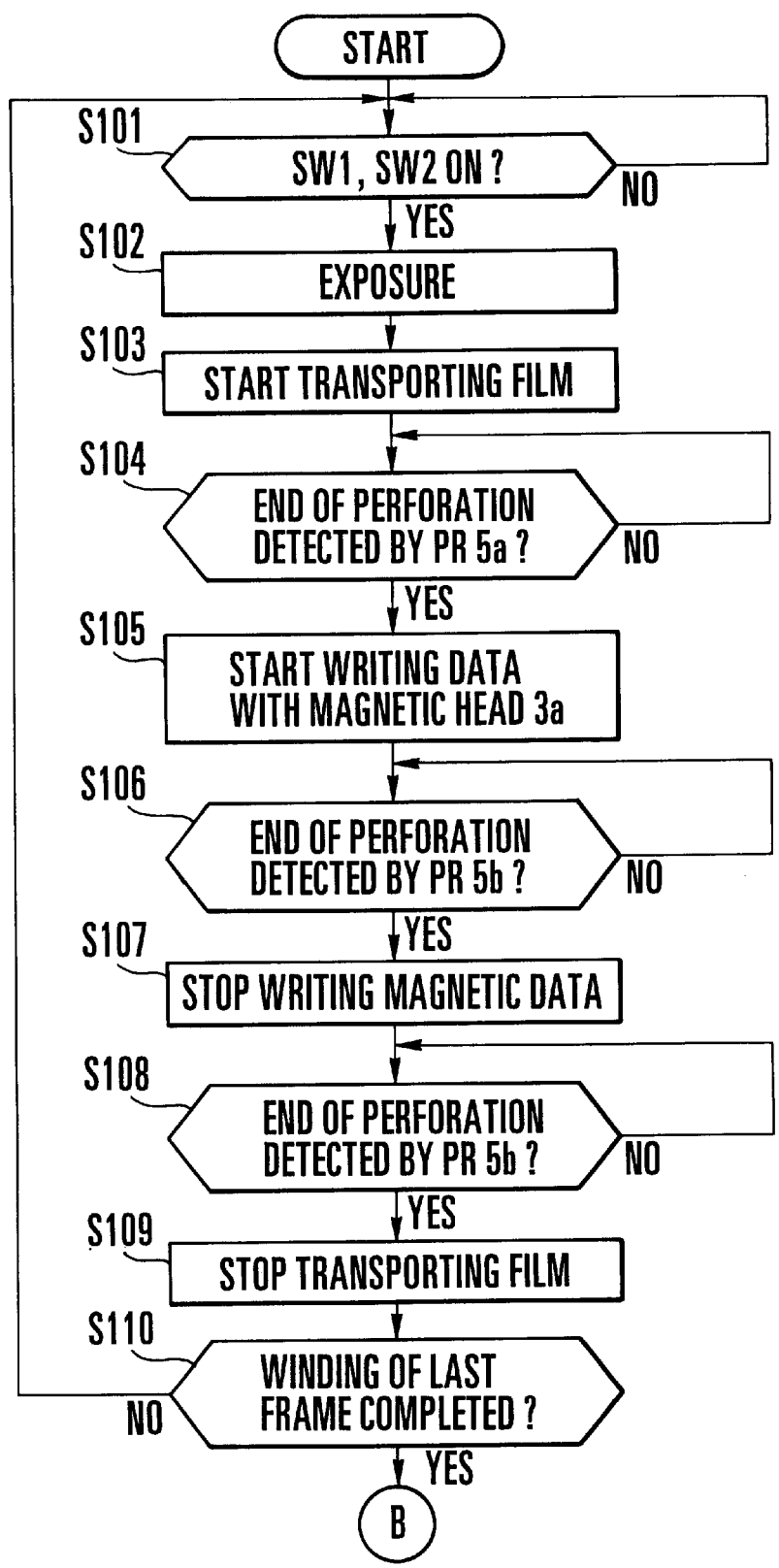
FIG. 8 is a flow chart showing a control operation of a control circuit included in the camera according to the first embodiment.
Figure 9:
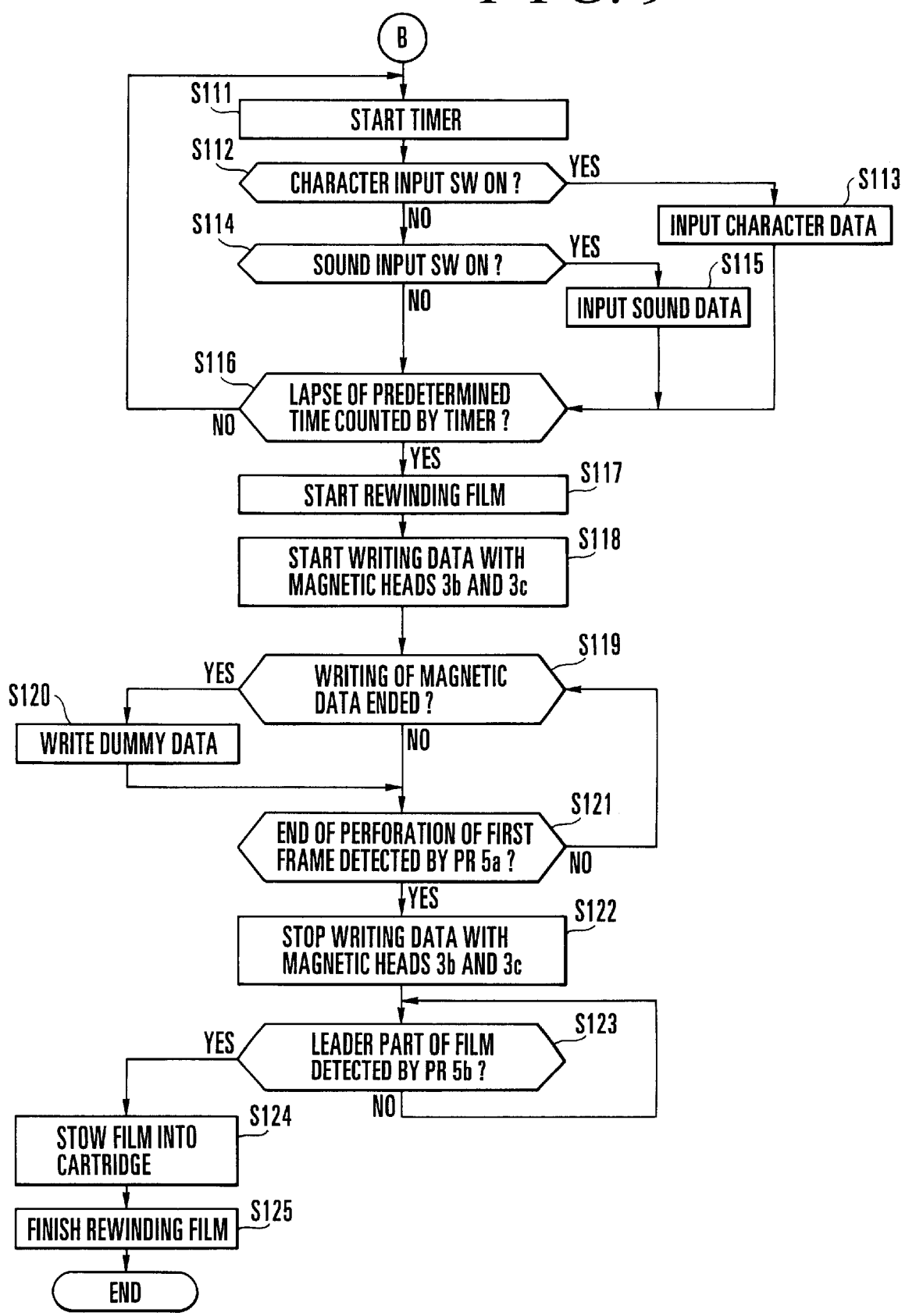
FIG. 9 is a flow chart showing a control operation of the control circuit of the camera relative to the first example of case according to the first embodiment.

Next, the operation of the camera having the above arrangement is explained referring to the flow charts of FIGS. 8 and 9, which show the control operation of the control circuit 21.

FIGS. 3(A) to 3(D) are diagrams for explaining the manner of recording magnetic information in the tracks $T_1$ and $T_2$ of the film 2 having the magnetic recording part, shown in FIG. 1, during process of winding the film 2.

Figures 3A, 3B, 3C, 3D:
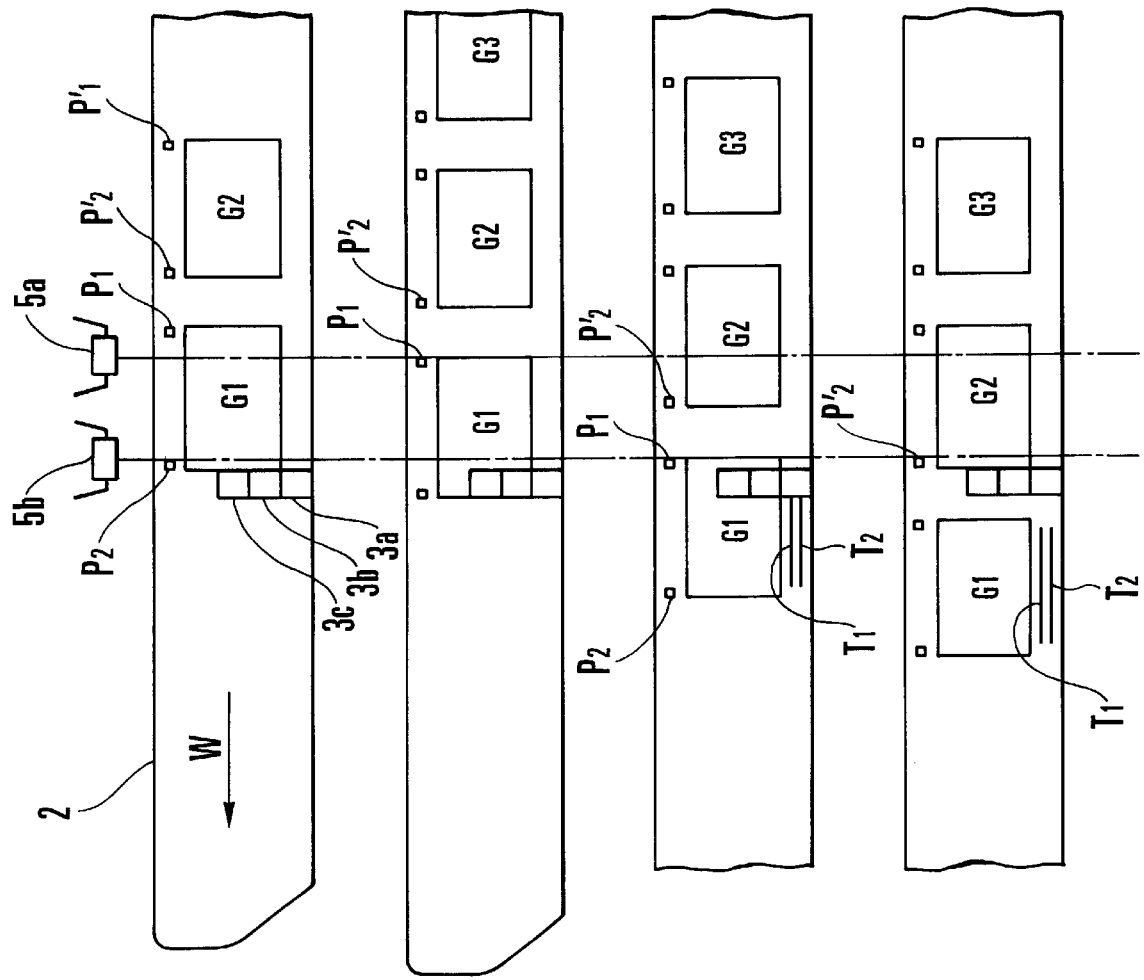
FIGS. 3(A) to 3(D) are diagrams for explaining a case where the magnetic recording is being performed in a track position corresponding to each image frame during process of winding the film by the camera according to the first embodiment.

At a step S101 of FIG. 8, when the camera is in a standby state of waiting for a photo-taking operation as shown in FIG. 3(A), a check is made to find if the switch 11 (SW1) and the switch 12 (SW2) are turned on in this state. If so, the flow of operation proceeds to a step S102. At the step S102, an exposure is made on an image frame G1 by the AF-and-AE control circuit 31. Upon completion of the exposure operation, the flow proceeds to a step S103. At the step S103, the film 2 begins to be transported by the film transport motor 8 in the direction of arrow W, which indicates winding the film 2.

At a step S104, after the commencement of film winding, a check is made to find if the end edge of the perforation $P_1$ is detected by the photo-reflector 5a. If so, the flow proceeds to a step S105. At the step S105, the magnetic head 3a, which is one of magnetic heads of the magnetic head array 3, is driven by the data writing circuit 33 to begin to write magnetic data relative to the image frame G1, as shown in FIG. 3(B). The magnetic data to be written in this instance includes a photo-taking condition corresponding to the image frame G1, such as a photo-taking date, a photo-taking mode, a shutter speed, an on-state or off-state of a flash device, etc.

At a step S106, with the film 2 transported further in the film winding direction W, a check is made to find if the end edge of the perforation $P_1$ is detected by the photo-reflector 5b. If so, the flow proceeds to a step S107. At the step S107, the driving action of the data writing circuit 33 on the magnetic head 3a for magnetic writing is brought to a stop, as shown in FIG. 3(C). At a step S108, a check is made to find if the film 2 is transported still further until the end edge of the perforation $P_2$ of the film 2 comes to be detected by the photo-reflector 5b. If so, the flow proceeds to a step S109 to bring the film transport action to a stop by deenergizing the film transport motor 8. Then, a frame-position-bringing-up process for the next image frame G2 is finished to bring forth a state as shown in FIG. 3(D). At a step S110, a check is made to find if the film 2 has been wound up to the last frame. If not, the flow of operation returns to the step S101. If so, the flow proceeds to the further flow of operation shown in FIG. 9.

FIGS. 4(A) to 4(C) are diagrams for explaining the manner of recording magnetic information in the tracks $T_3$ to $T_6$ of the film 2 having the magnetic recording part, shown in FIG. 1, during process of rewinding the film 2. FIG. 4(A) shows a state where the operation of writing magnetic data in the tracks $T_1$ and $T_2$ relative to the last frame has been completed, as found at the step S110.

Referring to FIG. 9, at a step S111, a timer contained in the control circuit 21 to count a standby time for waiting for the start of rewinding of the film 2 is started. At a step S112, a check is made to find if the character input switch 28 is pushed for input of some characters before the end of the above-stated standby time. If so, the flow proceeds from the step S112 to a step S113 to permit input of character data for editing. The character input switch 28 is composed of several push-buttons which are provided for selective input of some of characters of different kinds. If the character input switch 28 is found to be not pushed at the step S112, the flow proceeds to a step S114. At the step S114, a check is made to find if the sound input switch 29 is pushed during the predetermined standby time. If not, the flow proceeds to a step S116. If so, the flow proceeds to a step S115 to permit input of sound data. Sound data can be inputted through the microphone 22 to be recorded in the EEPROM 25 as long as the sound input switch 29 is in a pushed state. Further, if neither the character input switch 28 nor the sound input switch 29 is found at the step S116 to be pushed before the lapse of the predetermined standby time counted by the timer, the flow proceeds from the step S116 to a step S117.

At the step S117, the character and/or sound input operation is considered to have been finished, and the film transport motor 8 is caused to begin to transport the film 2 in the film rewinding direction R. At the same time, at a step S118, the data writing circuit 33 is caused to drive the magnetic heads 3b and 3c of the magnetic head array 3 to write magnetic data into the tracks $T_3$ to $T_6$, as shown in FIG. 4(B). The magnetic data to be written in this instance is data obtained at the steps S112 through S115, for example, character data such as messages relative to image frames and/or sound data of sounds or voices recorded at a site where a photograph is taken for each of the image frames. The details of such data are the same as what will be described later in the description of a second embodiment of the invention and are, therefore, omitted from the description given here.

The magnetic recording density for recording the magnetic information in the tracks $T_3$ to $T_6$ is set at a value which is either 1.5 or 6 times as high as the density of magnetic recording in the tracks $T_1$ and $T_2$ shown in FIGS. 3(C) and 3(D). A trigger signal is recorded between one data part and another data part in the character data or the sound data recorded in tracks $T_3$ to $T_6$. The recording density of the trigger signal is set at a value which does not exceed the recording density of the tracks $T_1$ and $T_2$. Therefore, each end part between one data part and another can be easily detected by virtue of the trigger signal. Incidentally, data to be written into the tracks $T_3$ to $T_6$ is converted into a data form which is readable in the direction of film winding.

At a step S119, with magnetic data written in during process of rewinding the film 2, if the writing contents of the magnetic data come to terminate before detection of the leader part of the film 2, the flow of operation proceeds to a step S120. At the step S120, dummy data such as "0000" or "FFFF" or the like, which is data having the continuous same periods, is recorded in track parts $T_3'$ to $T_6'$ as indicated with broken lines in FIG. 4(C). At a step S121, when the end edge of the perforation $P_2$ of the first frame G1 comes to be detected by the photo-reflector 5a, the flow proceeds to a step S122. At the step S122, the data writing circuit 33 is caused to stop driving the magnetic heads 3b and 3c. The data writing process then comes to an end in a state as shown in FIG. 4(c). At a step S123, with the film rewinding process further carried on, a check is made to find if the leader part of the film 2 is detected by the photo-reflector 5b. If so, the flow proceeds to a step S124 to stow the film 2 into the cartridge in a known manner. The flow then proceeds from the step S124 to a step S125 to finish the process of film rewinding.

Figures 5A, 5B, 5C:
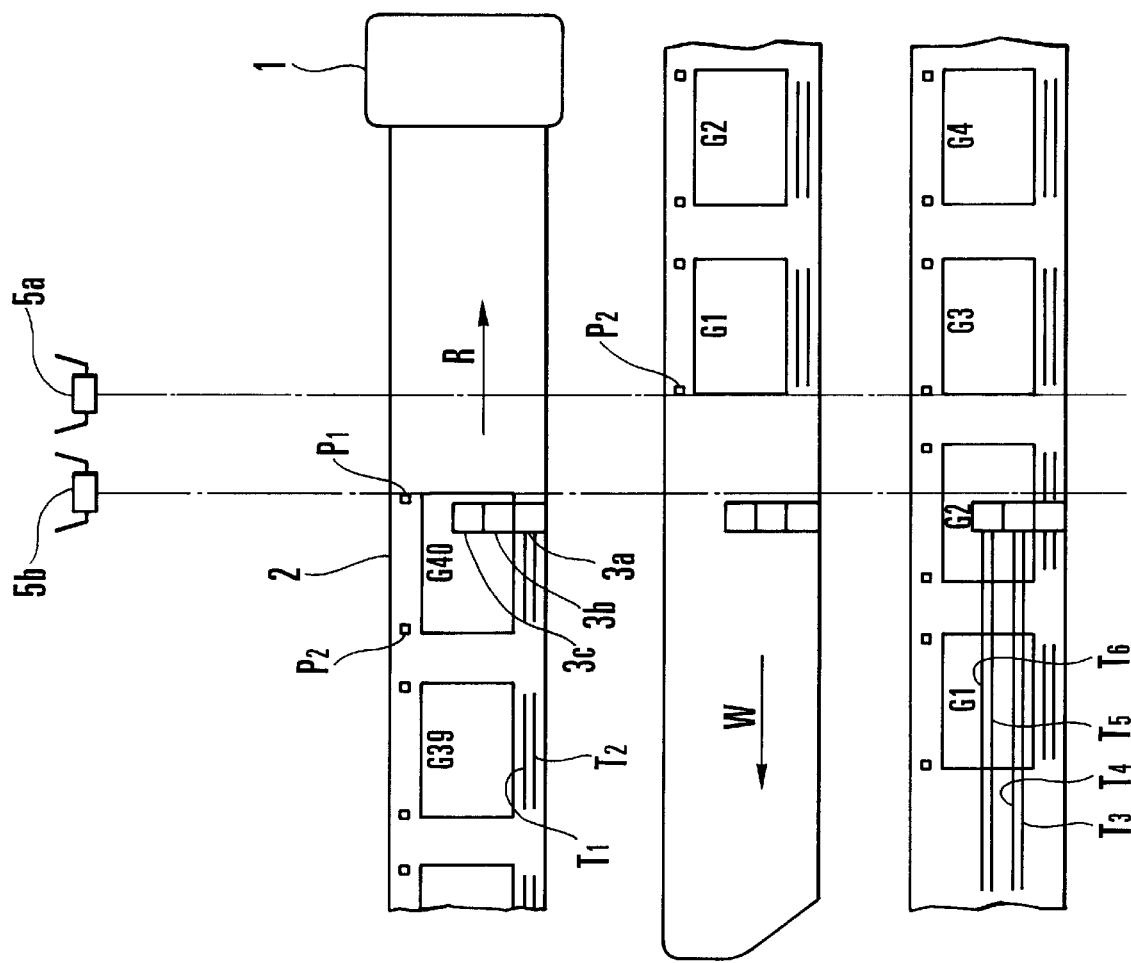
FIGS. 5(A) to 5(C) are diagrams for explaining a second example of case where the magnetic recording is being performed in an area of the film extending from a leader part thereof to the track position of an image recording area thereof by the camera according to the first embodiment.
Figure 10:
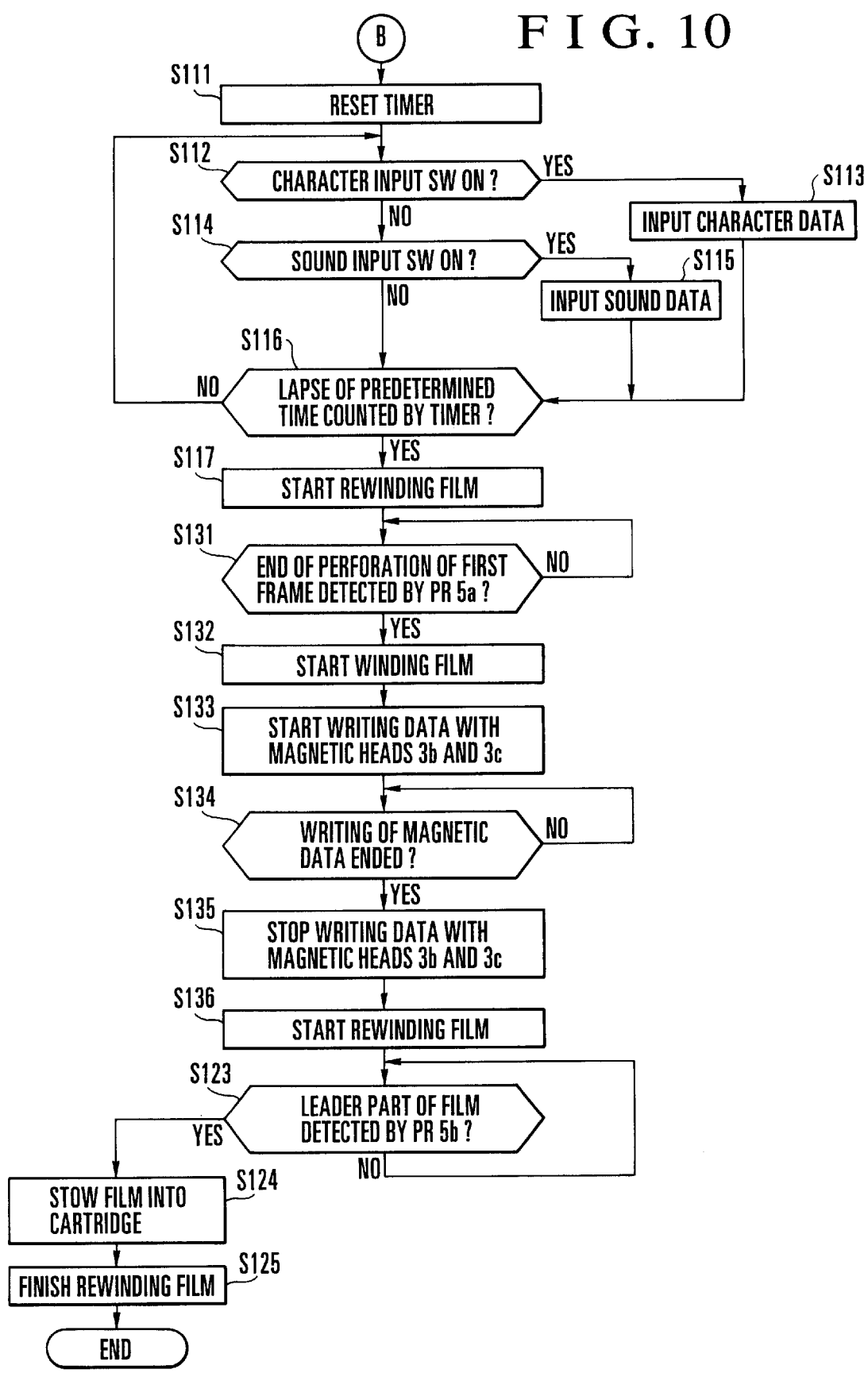
FIG. 10 is a flow chart showing a control operation of the control circuit of the camera relative to the second example of case according to the first embodiment.

FIGS. 5(A) to 5(C) are diagrams for explaining the manner of recording magnetic data during process of winding the film 2, as a second example of case where the magnetic data is recorded in the tracks $T_3$ to $T_6$ of the film 2 having the magnetic recording part shown in FIG. 1. Such a second example of case is explained referring to the flow chart of FIG. 10, which shows the control operation of the control circuit 21. In FIG. 10, all steps that are the same as the steps of FIG. 9 are indicated by the same step numbers as in FIG. 9. Further, all steps preceding the symbol (B) in FIG. 10 are the same as those shown in FIG. 8.

FIG. 5(A) shows, similar to FIG. 4(A), a state where the writing of magnetic data for the last frame into the tracks $T_1$ and $T_2$ has been completed. Referring to FIG. 10, steps S111 to S117 are executed in the same manner as in the case of FIG. 9. At a step S131, with the film transport motor 8 caused to begin to transport the film 2 in the rewinding direction R, a check is made to find if the film 2 is rewound up to the leader part thereof and the end edge of the perforation $P_2$ of the first frame G1 is detected by the photo-reflector 5a, as shown in FIG. 5(B). If so, the flow proceeds to a step S132. At the step S132, the film transport motor 8 is caused to begin to transport the film 2 again in the direction of film winding W. At the same time, at a step S133, the data writing circuit 33 is caused to drive the magnetic heads 3b and 3c of the magnetic head array 3 to write magnetic data into the tracks $T_3$ to $T_6$, as shown in FIG. 5(C).

At a step S134, a check is made to find if the process of writing the magnetic data is finished. If so, the flow proceeds from the step S134 to a step S135 to stop the data writing circuit 33 from driving the magnetic heads 3b and 3c. At a step S136, the film transport motor 8 is caused to begin to transport the film 2 in the direction of film rewinding R. Then, the flow proceeds from the step S136 to a step S123. Steps S123, S124 and S125 are executed to stow the film 2 into the cartridge upon detection of the leader part of the film 2 in the same manner as in the case of the first example shown in FIG. 9.

Figure 6:
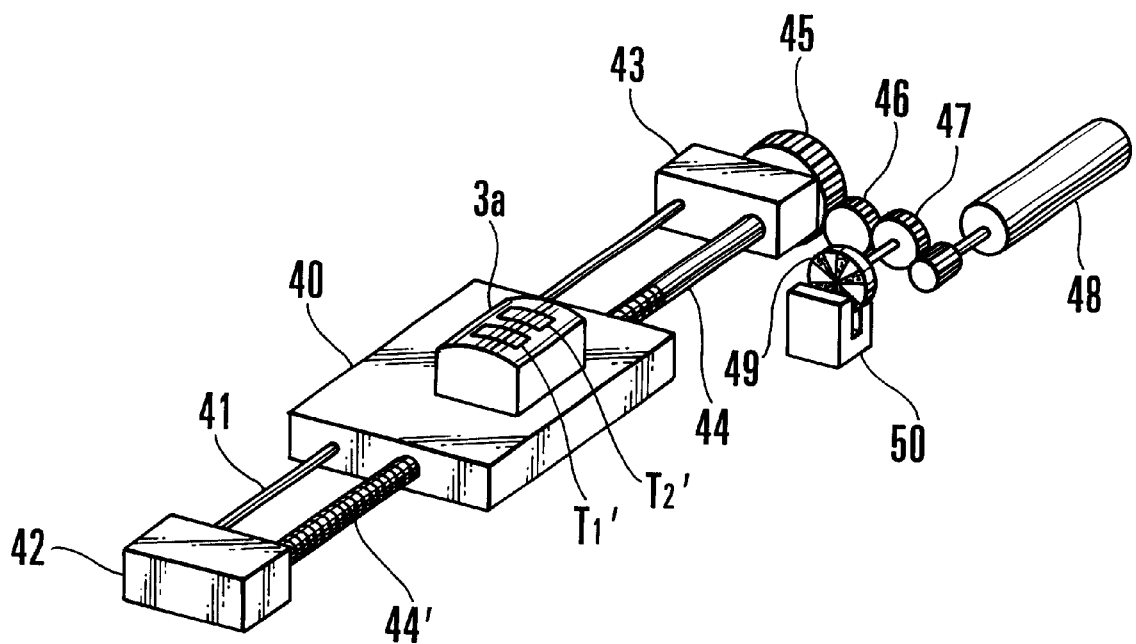
FIG. 6 is a perspective view showing a holding structure for holding a magnetic head relative to a third example of case where the magnetic recording is being performed in an area of the film extending from a leader part thereof to the track position of an image recording area thereof by the camera according to the first embodiment.

FIG. 6 and FIGS. 7(A) to 7(F) show the mechanical arrangement and the manner of recording magnetic data with only one magnetic head 3a, as a third example of case where the magnetic data is recorded in the tracks $T_3$ to $T_6$ of the film 2 having the magnetic recording part shown in FIG. 1. In the third example of case, as shown in FIG. 6, only one magnetic head 3a having two channels is provided for recording the magnetic data.

Referring to FIG. 6, the magnetic head 3a is secured to a head fixing plate 40. A head moving shaft 44 has a slide gear 45 mounted on its fore end. The slide gear 45 of the head moving shaft 44 is connected through idle gears 46 and 47 to a head sliding motor 48, which is controlled by the control circuit 21. When the head sliding motor 48 is driven, the head moving shaft 44 rotates to cause the magnetic head 3a to be slidden by a worm gear 44 of the shaft 44. A guide shaft 41 is arranged to prevent the magnetic head 3a from swaying. Support bases 42 and 43 are mounted on a pressure plate (not shown) of the camera. A pulse plate 49 is mounted on the upper part of the idle gear 47. The control circuit 21 counts outputs of a photo-reflector 50 which detects the rotation of the pulse disc 49 so as to decide the position of the magnetic head 3a.

Figure 11:
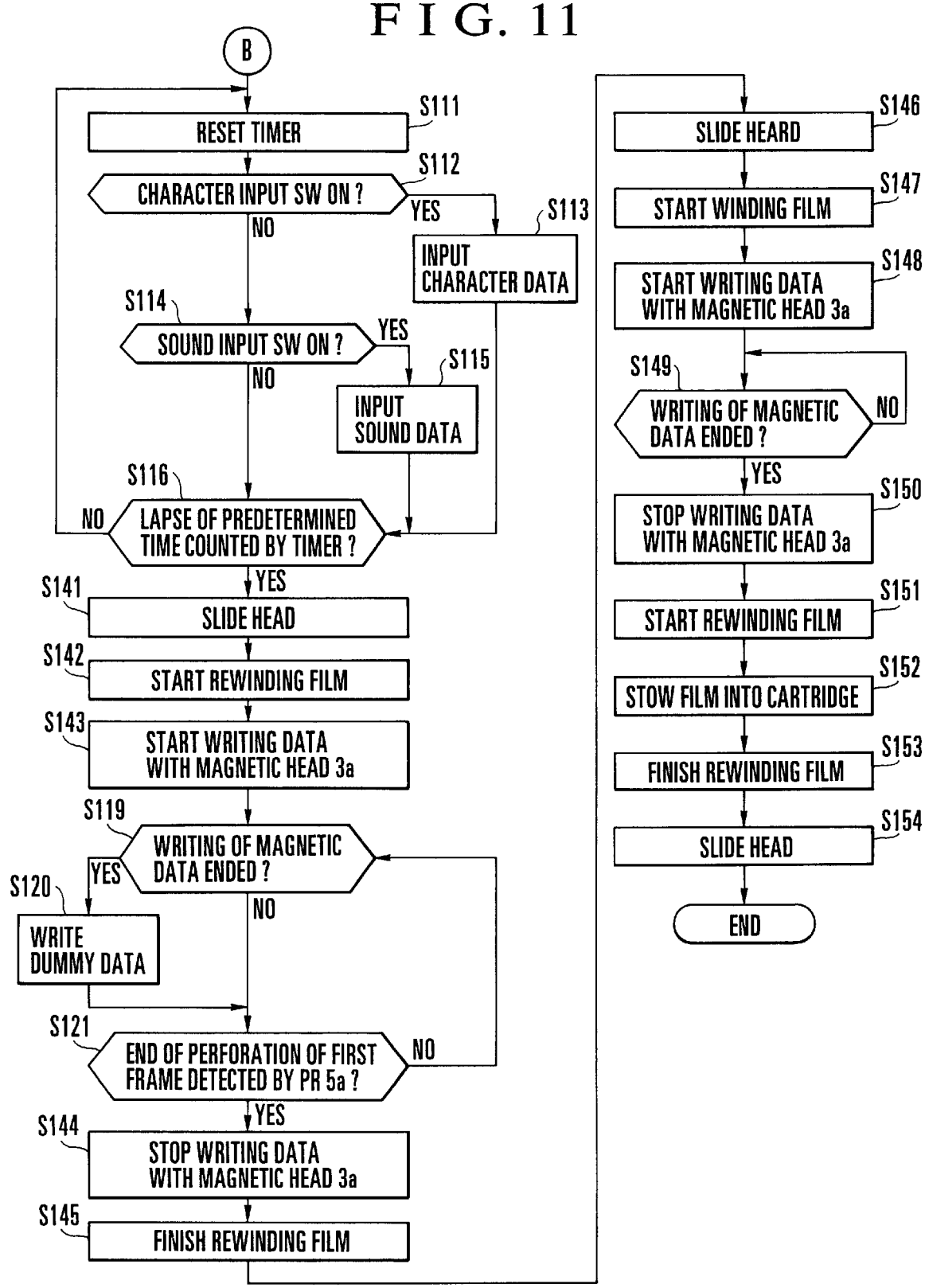
FIG. 11 is a flow chart showing a control operation of the control circuit of the camera relative to the third example of case according to the first embodiment.

The third example of case is explained referring also to FIG. 11, which is a flow chart showing a control operation of the control circuit 21. In FIG. 11, all steps that are the same as the steps of FIG. 9 are indicated by the same step numbers as in FIG. 9. Steps preceding the symbol (B) shown in FIG. 11 are the same as the steps shown in FIG. 8.

Figure 7A:
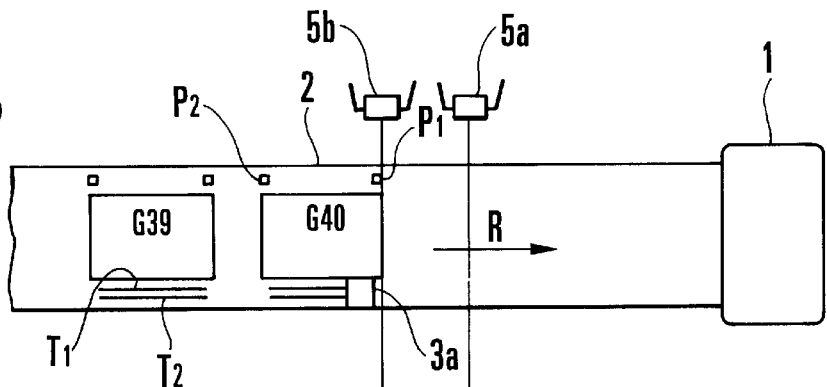
FIGS. 7(A) to 7(F) are diagrams for explaining a third example of case where the magnetic recording is being performed in an area of the film extending from a leader part thereof to the track position of an image recording area thereof by the camera according to the first embodiment.

FIG. 7(A) shows, similar to FIG. 4(A), a state where the writing of magnetic data for the last frame into the tracks $T_1$ and $T_2$ has been completed. Steps S111 to S116 of FIG. 11 are executed in the same manner as in the case of the FIG. 9. If no input is obtained from the character input switch 28 nor from the sound input switch 29 for a predetermined period of time, an input operation is considered to have finished. Then, the flow of operation proceeds from the step S116 to a step S141.

Figure 7B:
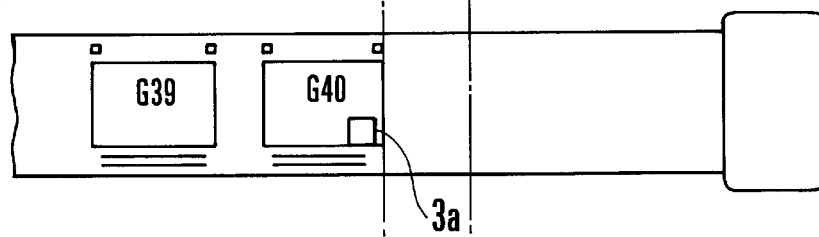
Figure 7C:
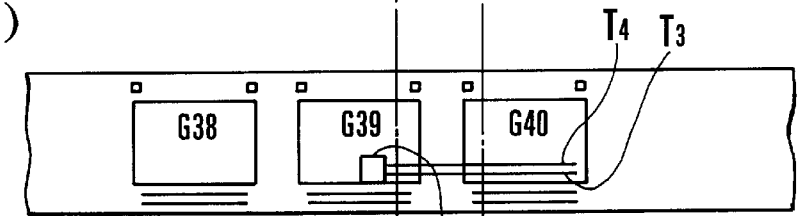

At the step S141, the head sliding motor 48 is caused to move the magnetic head 3a to the position of the tracks $T_3$ and $T_4$, as shown in FIG. 7(B). After that, at a step S142, the film transport motor 8 is caused to begin to transport the film 2 in the film rewinding direction R. At the same time, at a step S143, the data writing circuit 33 is caused to drive the magnetic head 3a to write magnetic data into the tracks $T_3$ and $T_4$, as shown in FIG. 7(c). The contents of the magnetic data to be recorded in this instance are character data and sound data similar to the data recorded in the case of FIGS. 4(A) to 4(C). The flow then proceeds to a step S119.

Figure 7D:
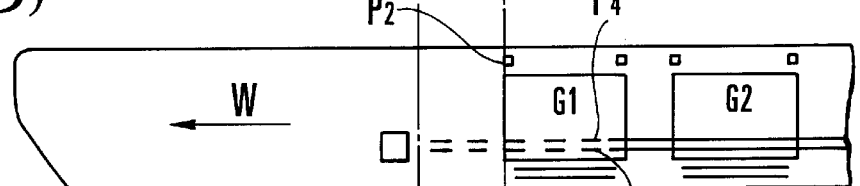

At the step S119, with the magnetic data written in during process of rewinding the film 2, if the writing contents of the magnetic data come to terminate before detection of the leader part of the film 2, the flow of operation proceeds to a step S120. At the step S120, dummy data such as "0000" or "FFFF" or the like which is data having the continuous same periods is recorded in track parts $T_3'$ to $T_6'$ as indicated with broken lines in FIG. 4(C). At a step S121, when the end edge of the perforation $P_2$ of the first frame G1 comes to be detected by the photo-reflector 5a, the flow proceeds to a step S144. At the step S144, the data writing circuit 33 is caused to stop driving the magnetic head 3a and to bring the writing of the magnetic data into the tracks $T_3$ and $T_4$ to an end. Then, there is obtained a state shown in FIG. 7(D). In FIG. 7(D), reference symbols $T_3'$ and $T_4'$ denote respectively dummy data which are the same as the dummy data written into the tracks $T_3$ and $T_4$ shown in FIG. 4(C)

Figure 7E:
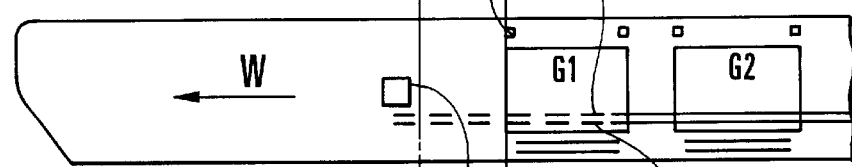
Figure 7F:
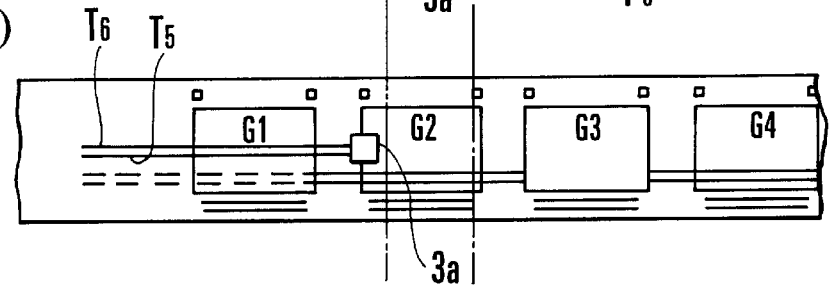

At a step S145, when the leader part of the film 2 is detected after the state of FIG. 7(D), the film transport motor 8 is brought to a stop. After that, at a step S146, the head sliding motor 48 is driven to move the magnetic head 3a to the position of the tracks $T_5$ and $T_6$, as shown in FIG. 7(E). At a step S147, with the magnetic head 3a brought to this position, the film transport motor 8 is caused to begin to transport the film 2 in the film winding direction W this time. At the same time, at a step S148, the data writing circuit 33 is caused to drive the magnetic head 3a to write magnetic data into the tracks $T_5$ and $T_6$. At a step S149, a check is made to find if the writing of the magnetic data has ended. Upon completion of the magnetic data writing into the Tracks $T_5$ and $T_6$, the flow proceeds to a step S150 to bring the driving action on the magnetic head 3a to a stop. Then, at a step S151, the film transport motor 8 is caused to begin to transport the film 2 in the film rewinding direction R. At a step S152, when the film 2 is completely stowed into the cartridge 1, the flow proceeds to a step S153 to bring the film transport motor 8 to a stop. After that, at a step S154, the head sliding motor 48 is driven to reset the magnetic head 3a to the position of the tracks $T_1$ and $T_2$. The flow of operation then comes to an end.

FIGS. 12 to 16 relate to a second embodiment of the invention. In the case of illustrations given in FIGS. 12 and 13, the invention is applied to a film image reproducing apparatus. In these figures, all parts of the second embodiment that are in common with the first embodiment described above, such as a film transport part, are indicated by the same reference numerals. All parts having different functions from the parts of the first embodiment are respectively indicated with reference numerals to each of which "100" is added.

Figure 12:
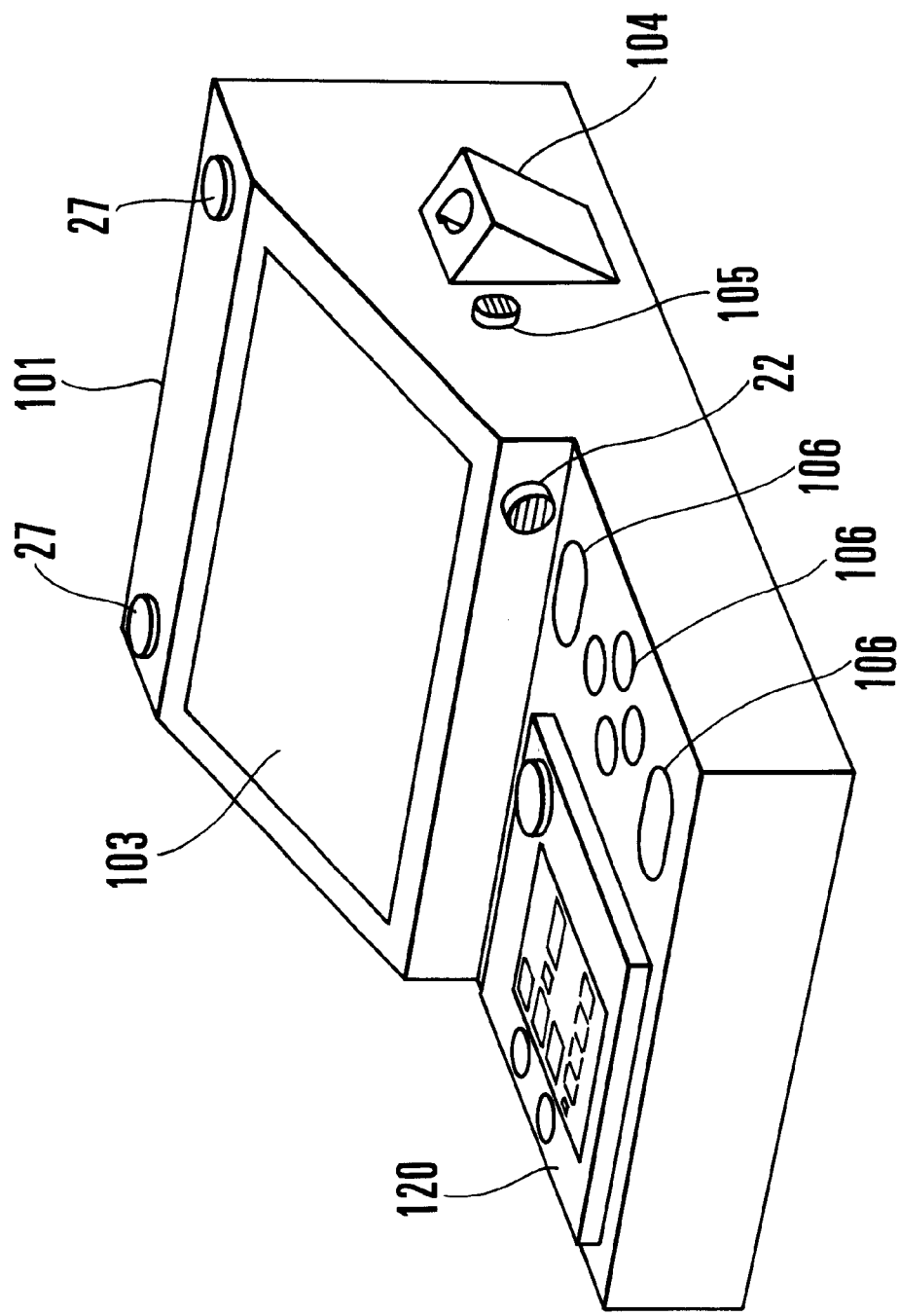
FIG. 12 is a perspective view showing a film image reproducing apparatus according to a second embodiment of the invention.

FIG. 12 shows in a perspective view the appearance of the film image reproducing apparatus according to the second embodiment. Referring to FIG. 12, the body 101 of the film image reproducing apparatus is provided with a cartridge holder 104 for loading the apparatus with a cartridge. An opening-and-closing knob 105 is provided near to the cartridge holder 104. The cartridge holder 104 is arranged to protrude from one side of the body 101 in an open state as shown in FIG. 12 when a lock mechanism (not shown) is unlocked by operating the opening-and-closing knob 105.

A display part 103 is composed of display elements. The display part 103 is arranged to display an image obtained from an image sensor 110 which is a CCD or the like (shown in FIG. 13) and to display an operation menu for operations on the film image reproducing apparatus. Operation menu control buttons 106 are arranged to enable the user of the apparatus to operate the apparatus to reproduce images, to rewind the film 2 and to edit reproduction effects and magnetic information while watching the display made on the display part 103. The film image reproducing apparatus is provided also with a remote-control unit body 120, which can be used in common for the camera described above as the first embodiment.

Figure 13:
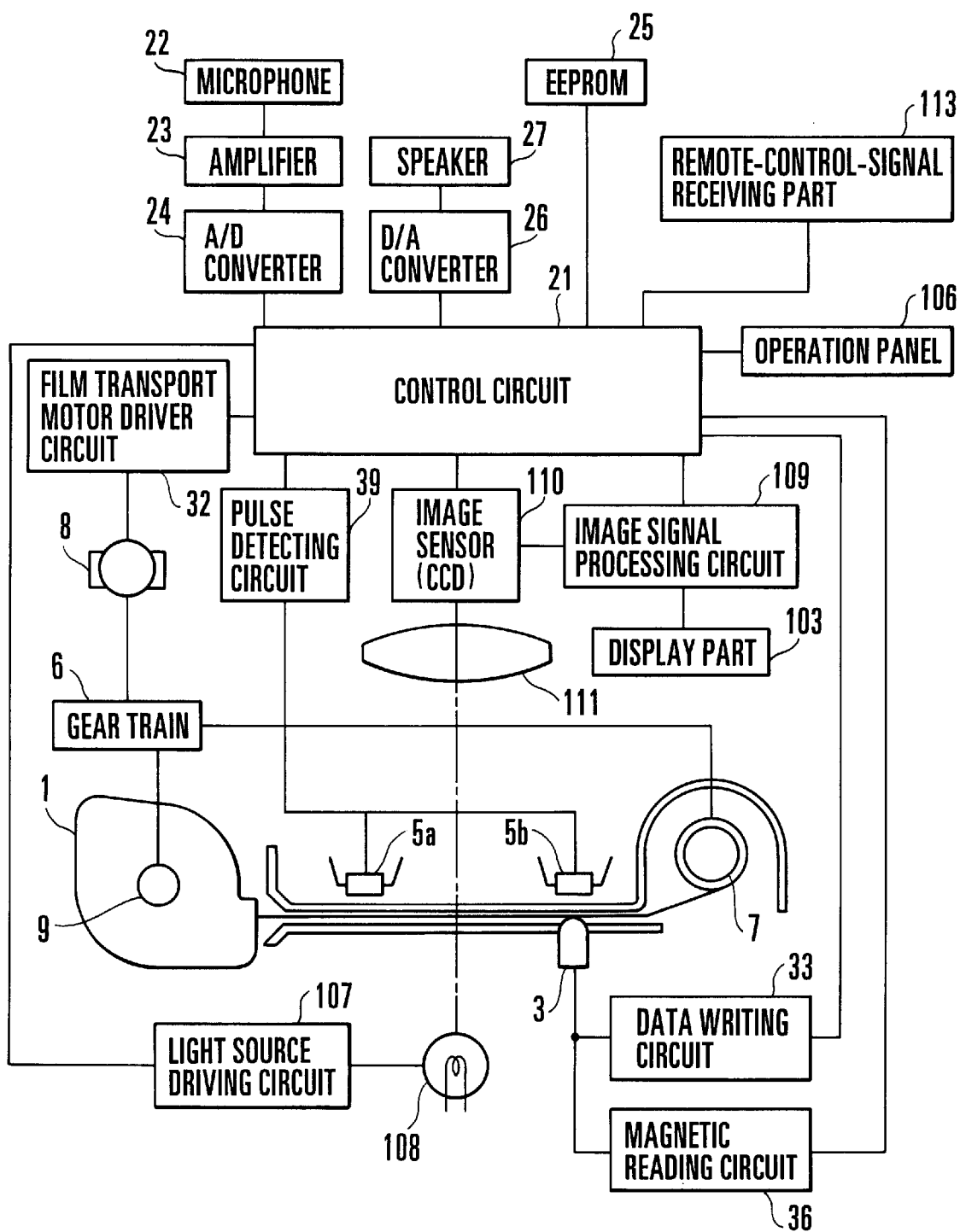
FIG. 13 is a block diagram showing the circuit arrangement of the film image reproducing apparatus according to the second embodiment.

FIG. 13 shows in a block diagram the circuit arrangement of the film image reproducing apparatus. In FIG. 13, all parts that are the same as the parts shown in FIG. 12 are indicated by the same reference numerals as in FIG. 12.

In FIG. 13, reference numeral 108 denotes a light source, which is composed of a light emitting body such as a surface light emission type fluorescent lamp. The light source 108 is arranged to illuminate with light a developed film 2 which is drawn out from a cartridge 1. The light is projected from the light source 108 onto the picture plane of the developed film 2. The light passing through the film 2 comes to form an image on the image sensor 110 through an optical system 111. A light source driving circuit 107 is arranged to drive the above-stated light source 108. An image signal processing circuit 109 is arranged to A/D (analog-to-digital) convert into a video signal an image picked up by the image sensor 110 from the film 2. The A/D-converted video signal is stored in an EEPROM 25 through a control circuit 21. A remote-control-signal receiving part 113 is arranged to conduct communication by means of a built-in chip (not shown) when the remote-control unit body 120 is mounted on the apparatus and by means of a built-in infrared signal receiving circuit (not shown) when the remote-control unit body 120 is not mounted on the apparatus.

FIGS. 14(A) to 14(D) show the operation part of the remote-control unit body 120 together with sound and text editing operations performed by way of example.

Referring to FIGS. 14(A) to 14(D), a mode display part 60 is composed of display elements, including a "SELECT"

part 61 which is arranged to show the contents of input of sounds, etc., a "NUMBER" part 62 which shows numbers of data, a "FRAME" part 63 which shows the correlation of data to image frames, and other parts arranged to show the details of editing operation to be carried out. The remote-control unit body 120 is provided with a menu-up (upward menu selecting) button 65 and a menu-down (downward menu selecting) button 66. The menu of any of the above-stated parts 61, 62 and 63 can be selected by pushing the menu-up button 65 or the menu-down button 66.

The remote-control unit body 120 is further provided with a sound selection mark 67 and a text selection mark 68. When a selection dial 69 is rotated with the "SELECT" part 61 selected, an inverse triangle mark 71 moves to permit selection of either a sound or a text. Reference numeral 70 denotes an execution button. After the mode selection button 64 is pushed and a recording mode "REC" part 72, a reproduction mode "PLAY" part 73, a setting mode "SET" part 74, or an erasing mode "DEL" part 75 is selected, when the execution button 70 is pushed, any of these modes can be carried out as selected.

Figure 14A:
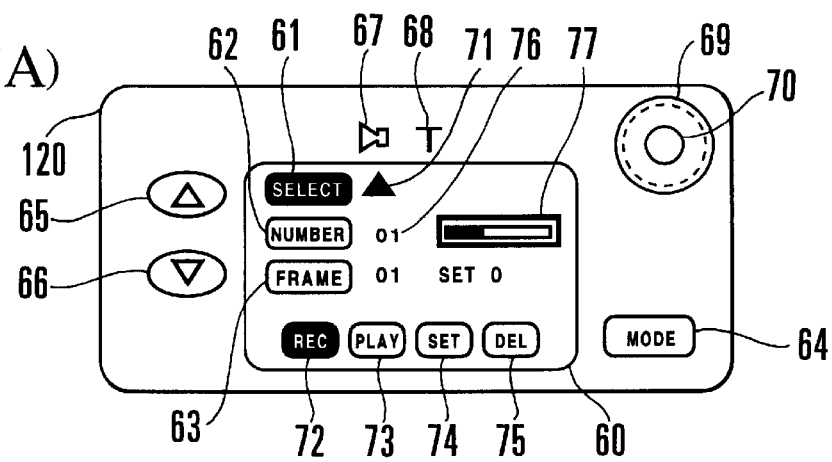
FIGS. 14(A) to 14(D) are diagrams for explaining an operation part of a remote-control unit body and an operating method thereof according to the second embodiment.

FIG. 14(A) shows a sound recording state. In this case, the inverse triangle mark 71 which is at the "SELECT" part 61 is adjusted to the sound selection mark 67. The "REC" part 72 is selected by the mode selection button 64. After that, the execution button 70 is pushed. Sound recording is performed by this operation. Then, a new recording data number is shown at the data number display part 76 of the "NUMBER" part 62, and the state of progress of the sound recording is shown at a state display part 77. The state of sound recording comes to an end either when the execution button 70 is pushed again or when a limit of memory capacity is reached. Further, in a case where it is desired to delete some data inputted, the mode selection button 64 is operated to select the "DEL" part 75. The menu-up button 65 or menu-down button 66 is operated to select the "NUMBER" part 62. The selection dial 69 is operated to select a data number of the data number display part 76. After that, the data displayed at the data number display part 76 is deleted by pushing the execution button 70. Then, information relative to the image frames is also deleted at the same time.

Figure 14B:
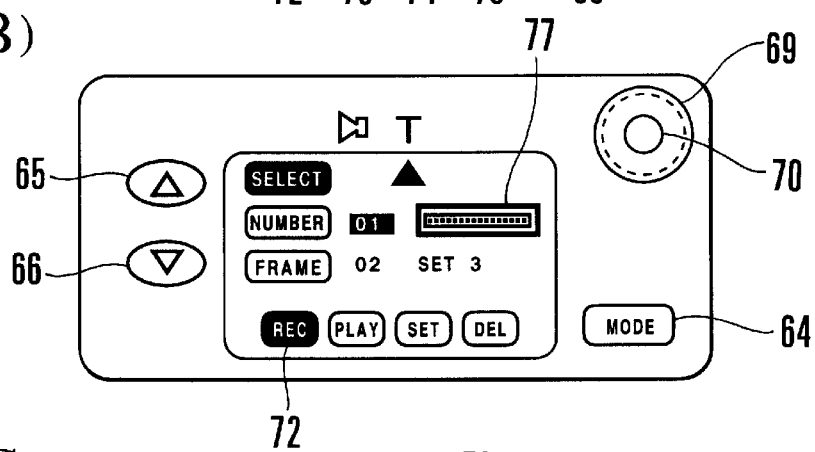

FIG. 14(B) shows a character recording state. A character recording mode can be obtained by adjusting the inverse triangle mark 71 of the "SELECT" part 61 to the text selection mark 68 and operating the mode selection button 64 to select the "REC" part 72. The display state of the state display part 77 changes to a character display state. The selection dial 69 is rotated to select a input character position of the state display part 77. The menu-up button 65 or the menu-down button 66 is operated to select characters. Further, when the execution button 70 is pushed, a new recording data number which is on display at the data number display part 76 is recorded.

Figure 14C:
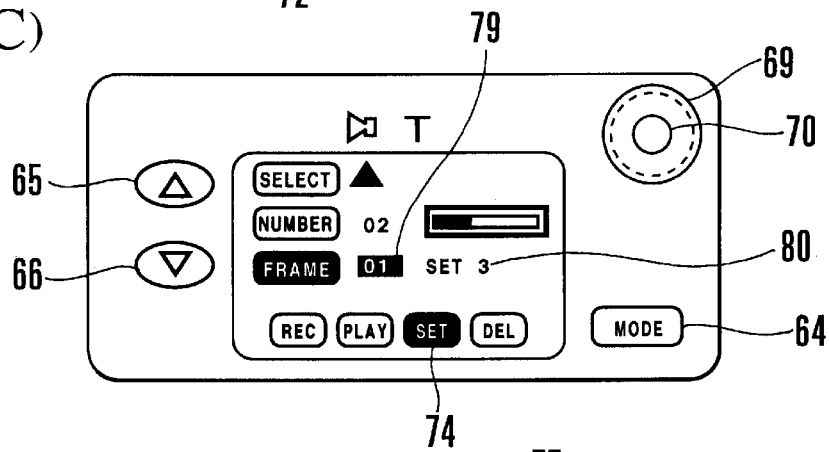

FIG. 14(C) shows a state in which image frames are correlated with input data. In this state, the menu-up button 65 and the menu-down button 66 are operated to select the "FRAME" part 63. The mode selection button 64 is operated to select the "SET" part 74. After that, the correlating mode is carried out by pushing the execution button 70. More specifically, the number of an image frame displayed at an image frame number display part 79 is correlated with the number of sound recording data on display at the data number display part 76. Further, a data number related to the image frame number displayed at the image frame number display part 79 is displayed at a data number display part 80. Further, information relative to each frame then can be reproduced by operating the mode selection button 64 to select the "PLAY" part 73, rotating the selection dial 69 to change the number of image frame displayed at the frame number display part 78 from one number over to another and pushing the execution button 70.

Figure 14D:
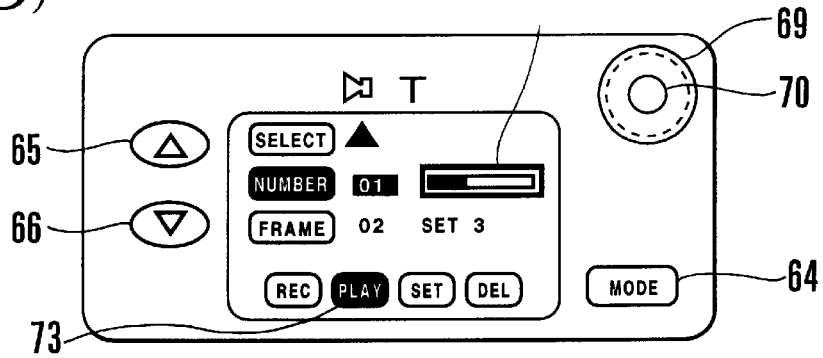

FIG. 14(D) shows a reproducing state. In this case, the menu-up button 65 or the menu-down button 66 is operated to select the "NUMBER" part 62. The mode selection button 64 is operated to select the "PLAY" part 73. After that, the execution button 70 is pushed to carry out a reproducing operation. Then, the data of a recording data number on display at the data number display part 76 is reproduced and the state of progress of reproduction is displayed at the state display part 77.

FIG. 15 shows, in a table, magnetic information read from the film 2, or magnetic information of each track stored in the EEPROM 25 by the editing work shown in FIGS. 14(A) to 14(D).

In the table of FIG. 15, a column of track $T_3$ shows information on frames. A column of track $T_4$ shows text information. A column of track $T_5$ shows sound information. In the column of track $T_3$, each part shown as "F( )" denotes a frame number. In the column of track $T_4$, each part shown as "T( )" denotes a text information number. In the column of track $T_5$, each part shown as "S( )" denotes a sound information number.

For example, a part "F(1)–T(1)" on the line "a" of the column of track $T_3$ shows that a text information part reading as "T(1)-IN THE FIRST SNOWFALL" is correlated to the frame "1" in the record. A part "F(2)–T(1), S(1)" on the line "b" of the column of track $T_3$ indicates that the text information part T(1) with which both the frame "1" and sound information S(1) are correlated is correlated to the frame "2". In other words, a text and sound information part which has been once inputted can be correlated to a plurality of frames. A symbol "ZU" recorded on a line "g" in the column of track $T_3$ represents a zooming instruction to be carried out at the time of image reproduction. Editing work is performed by using the operation menu control buttons 106 of the film image reproducing apparatus body 101 while watching the display part 103.

Instructions for obtaining some desired effects of image reproduction other than the above-stated zooming instruction include, among others, a fade-in and fade-out effect, a picture moving pattern and a reproduction time. An end signal indicating the end of data is recorded at the last part of each track. In recording on the film 2 the information indicated in the above-stated columns of the tracks $T_3$, $T_4$ and $T_5$, a trigger signal is written between adjacent information parts, such as lines "a" and "b" in the column of track $T_3$. The density of recording the trigger signal is set to be not exceeding the recording density of the tracks $T_1$ and $T_2$. The density of recording the magnetic information in the tracks $T_3$ to $T_6$ is set to be either one of 1.5 times to 6 times as high as the magnetic information recording density of the tracks $T_1$ and $T_2$ shown in FIGS. 3(A) to 3(D). The difference in recording density effectively facilitates detection of a data end part between one data part and another.

Figure 16:
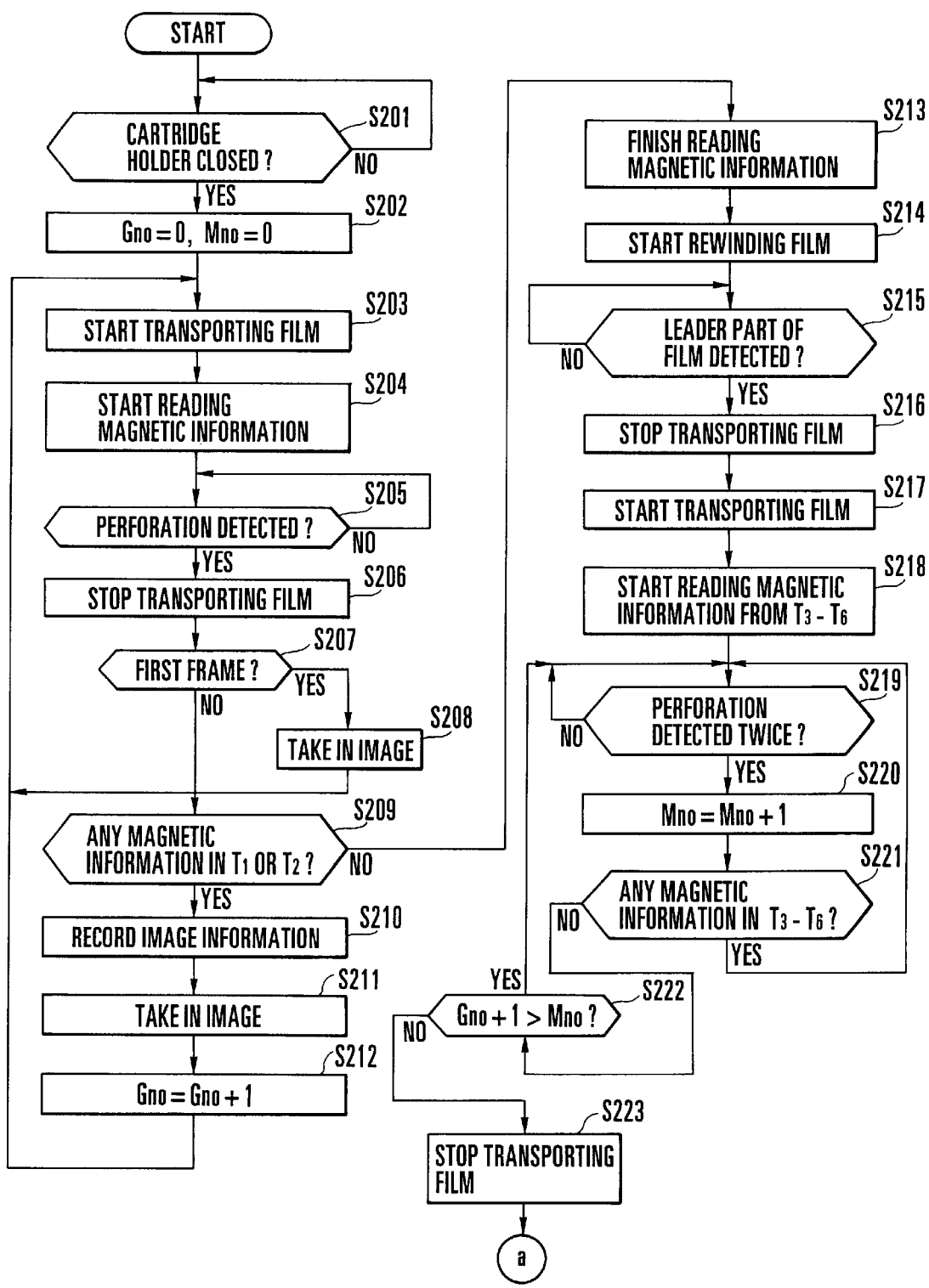
FIG. 16 is a flow chart showing a control operation of a control circuit included in the film image reproducing apparatus according to the second embodiment.
Figure 17:
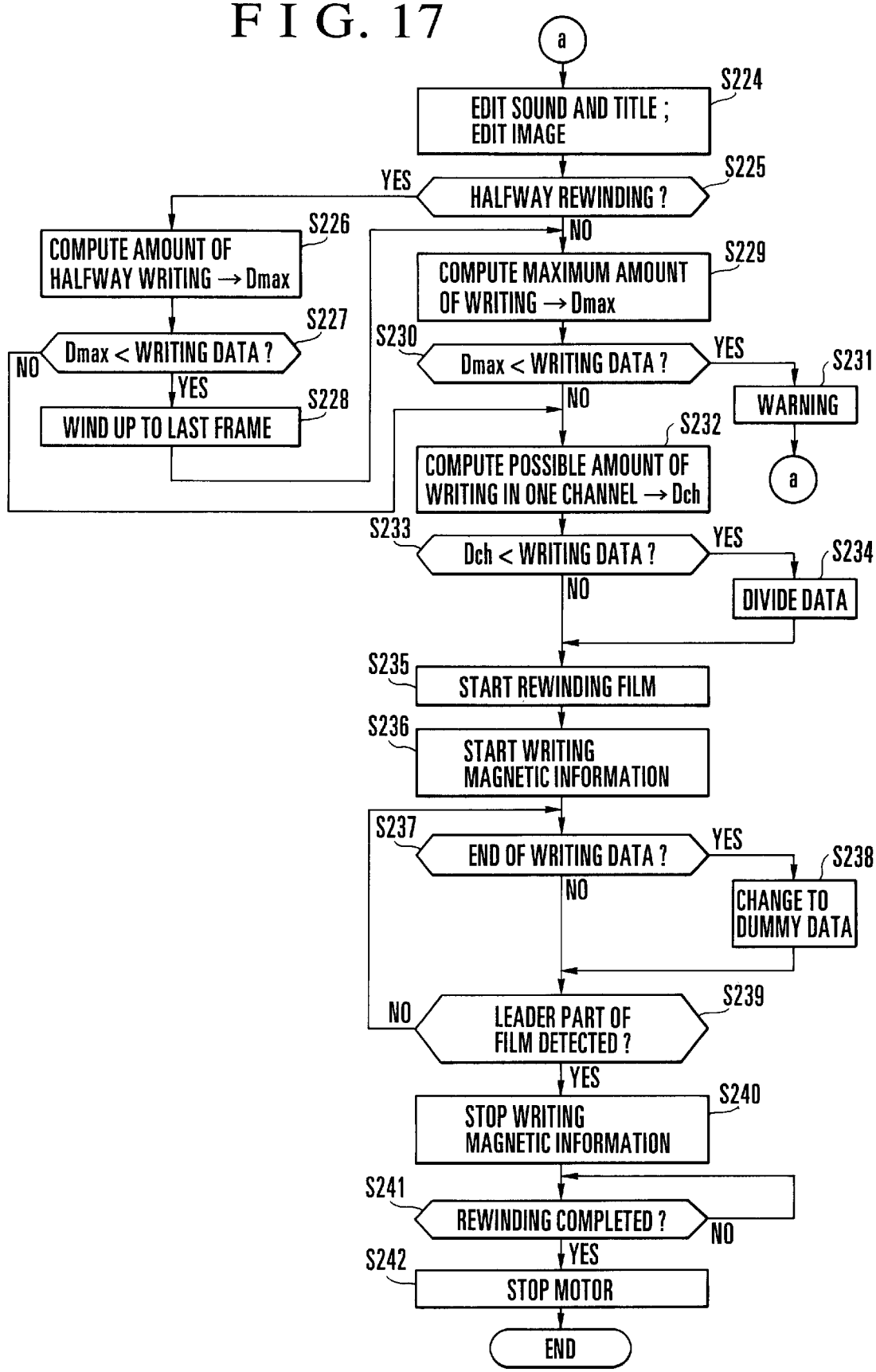
FIG. 17 is a flow chart showing a control operation succeeding the control operation shown in the flow chart of FIG. 16.

FIGS. 16 and 17 show, in flow charts, the control operation of the control circuit 21 according to the second embodiment. In respect of the arrangement of the magnetic head, that of recording tracks and positional relation of the photo-reflectors 5a and 5b to the perforations $P_1$ and $P_2$, the arrangement of the second embodiment is assumed to be the same as that of the first embodiment shown in FIGS. 3(A) to 3(D) and FIGS. 4(A) to 4(C). The operation of the second embodiment is described with reference the flow charts of FIGS. 16 and 17 as follows.

At a step S201 of FIG. 16, a check is made to find if a holder switch (not shown) turns on with the cartridge 1 loaded into the cartridge holder 104. If so, the flow proceeds to a step S202. At the step S202, the memory arranged to store the last image frame number Gno and the last track frame number Mno is set to "0". At a step S203, the motor driver circuit 32 is caused to forwardly energize the film transport motor 8. The film 2 begins to be wound. At a step S204, at the same time as the film winding, the magnetic reading circuit 36 is driven to start reading magnetic information from the tracks $T_1$ and $T_2$.

At the next step S205, a check is made to find if the end edge of the first perforation $P_2$ is detected by the photo-reflector 5b. If so, the flow proceeds to a step S206. At the step S206, the film transport motor 8 is deenergized to set the first image frame G1 in position. At this point of time, the magnetic head array 3 is situated on the leader part side of the image frame G1 as shown in FIG. 3(A). Therefore, in this state, the magnetic information part of the tracks $T_1$ and $T_2$ corresponding to the image frame G1 has not yet been read. At the next step S207, a check is made for the first frame. Since the frame in position is the first frame in this instance, the flow proceeds from the step S207 to a step S208. At the step S208, the image of the first frame is taken in. The flow then returns to the step S203.

The film transport motor 8 is again forwardly energized at the step S203. The magnetic information begins to be read at the step S204. The film transport motor 8 is deenergized to stop the film transport at the step S206, when two perforations are detected. Then, the second image frame G2 is set in position. The magnetic information read from the tracks $T_1$ and $T_2$ at this time is information corresponding to the image frame G1. At the next step S207, since the current frame is not the first frame, the flow proceeds to a step S209 instead of the step S208. At the step S209, a check is made to find if any magnetic information corresponding to the image frame G1 is written in the tracks $T_1$ and $T_2$. If so, image data taken in at the image frame G1 is decided to be valid, and the flow of operation proceeds to a step S210. At the step S210, the image data is compressed and stored (recorded) in the memory. At a step S211, the image data of the image frame G2 which is currently set in position is taken in. At a step S212, the last image frame number Gno is incremented by one (Gno=Gno+1). The flow then returns to the step S203. The loop of steps from the step S203 through the step S212 is repeated as long as there is magnetic information until the loop process reaches the last frame indicated on the cartridge 1.

After the step S212, when it is found at the step S209 that any magnetic information is no longer written in the tracks $T_1$ and $T_2$, the image data which is taken in immediately before (last taken in is decided to be invalid, and the flow proceeds from the step S209 to a step S213. At the step S213, the magnetic information reading action is bought to an end. At a step S214, the film transport motor 8 is reversely energized to start rewinding the film 2. At a step S215, in order to set the magnetic head array 3 to the position of a predetermined leader part of the film 2, the film rewinding process is allowed to continue until the end edge of the perforation $P_2$ of the first frame G1 is detected by the photo-reflector 5a. When the leader part of the film 2 is detected, the flow proceeds from the step S215 to a step S216. At the step S216, the film transport motor 8 is stopped from transporting the film 2, so that the state shown in FIG. 5(B) is obtained.

At a step S217, the film transport motor 8 is forwardly energized to start winding the film 2. At the same time, the flow proceeds to a step S218. At the step S218, the magnetic reading circuit 36 is driven to begin to read magnetic data from the tracks $T_3$ to $T_6$. At the next step S219, the number of times for which the end edge of the perforation $P_1$ is detected by the photo-reflector 5a is counted, and a check is made to find if the end edge of the perforation $P_1$ has been counted twice. If so, the flow proceeds to a step S220. At the step S220, the last track frame number Mno is counted upward by one, i.e., incremented by one. At a step S221, a check is made to find if some magnetic information is written in any of the tracks $T_3$ to $T_6$. If so, the flow returns to the step S219 to continue the magnetic information reading action. The magnetic information reading action on the tracks $T_3$ to $T_6$ is repeated until it reaches the last frame as indicated on the cartridge 1.

If no magnetic information written in the tracks $T_3$ to $T_6$ is found at the step S221, the magnetic reading circuit 36 is stopped from driving, and the flow of operation proceeds from the step S221 to a step S222. At the step S222, the value of the last image frame number Gno is compared with that of the last track frame number Mno to find if the value of Gno is larger than the value of Mno. If so, the film 2 is allowed to be further transported until the position of the magnetic head array 3 comes to the position of the last image frame. After that, the flow proceeds from the step S222 to a step S223. At the step S223, the film transport action is brought to a stop. In this instance, since the magnetic head array 3 is located before a designated image frame, the last image frame number Gno is incremented by one (Gno+1) at the step S222.

Next, at a step S224 which is shown in FIG. 17, the image frame data and the sound and text data taken in are edited. The editing work includes, in this case, deciding the sequence of images to be reproduced by the film image reproducing apparatus, and reproduction effects to be introduced in reproducing on the image display part 103 or on an external display device, such as zooming, fade-in and fade-out, etc. The operator is expected to do such editing work on the operation menu control buttons 106 while watching the display part 103 of the film image reproducing apparatus. Further, selection of sounds and editing of text for title displays suited for the reproduced images are expected to be made by operating the remote-control unit body 120. Upon completion of editing, "recording on the film" shown in a menu is selected at the operation menu control buttons 106. The flow of operation then proceeds from the step S224 to a step S225.

At the step S225, a check is made to find if the position of the currently set image frame precedes the last frame indicated on the cartridge, i.e., to find if the film 2 loaded in the apparatus is in a half-way rewound state. If so, the flow proceeds to a step S226. At the step S226, a maximum amount of magnetic information that can be written (into all the tracks $T_3$ to $T_6$) by rewinding the film 2 from the position of the currently set image frame is computed. A value thus computed is substituted for a value Dmax. At the next step S227, the value Dmax is compared with a writing data amount, i.e., an amount of data to be written, stored in the memory such as the EEPROM 25 or the like. If the writing data amount is found to be larger than the value Dmax, the flow proceeds to a step S228 to wind the film 2 up to the last frame indicated by the cartridge 1. Then, the flow proceeds from the step S228 to a step S229. At the step S229, a maximum writable amount is recomputed as the value Dmax. At a step S230, the recomputed value Dmax is compared again with the writing amount of data. If the writing data amount is found to be still larger than the value Dmax, the flow proceeds to a step S231 to make a warning display at the display part 103. At the same time, the writing magnetic information is considered to be not allowable, and the flow returns to the step S224. In the event of the warning at the step S231, the operator of the apparatus is urged to correct the result of editing by deleting or reducing the amount of sound data and that of text data through the editing work at the step S224. After that, no writing action on the film 2 is allowed until the amount of data to be written in becomes less than the value Dmax. The film image reproducing apparatus according to the second embodiment of the invention is arranged to permit the above-stated editing work to be brought to an end by rewinding the film 2 without writing no magnetic data into its tracks.

In a case where the amount of data to be written in is found at the step S227 or S230 to be not exceeding the value of the maximum data amount Dmax, the flow of operation proceeds from the step S227 or S230 to a step S232. At the step S232, an amount of data writable in one track is computed and substituted for a value Dch. At the next step S233, the amount of data to be written in is compared with the value Dch. If the amount of data to be written in is found larger than the value Dch, the data writing cannot be completed with one track. In that case, therefore, the flow proceeds from the step S233 to a step S234. At the step S234, the data is divided for writing also in other tracks. At the next step S235, the film 2 begins to be rewound. At the same time, at a step S236, the data writing circuit 33 is driven to begin writing magnetic information into the tracks $T_3$ to $T_6$.

At a step S237, the state of writing into the tracks $T_3$ to $T_6$ is monitored. When magnetic information writing for any of these tracks is found to have come to an end, the flow proceeds to a step S238 to carry on the magnetic recording process by changing the writing data for that track over to dummy data such as "00000" or "FFFFF" having the continuous same periods. At a step S239, a check is made for detection of a leader part of the film 2. When the end edge of the perforation $P_2$ of the first image frame G1 which indicates arrival of the leader part of the film 2 is detected by the photo-reflector 5a, the flow proceeds to a step S240. At the step S240, the process of writing magnetic information is brought to an end. The thus-obtained state corresponds to the state shown in FIG. 4(C).

At a step S241, with the film 2 rewound further, when the leader part of the film 2 is detected by the photo-reflector 5a, the process of film rewinding is considered to be finished. At a step S242, film rewinding is brought to an end after the film 2 is allowed to be rewound still further for a predetermined period of time. The film transport motor 8 is then brought to a stop.

According to the arrangement of each embodiment disclosed, the tracks $T_3$ to $T_6$ which are regarded as a first recording track are formed as a magnetic recording part of a film to continuously record magnetic data from the leader part of the film through the image recording area thereof. Therefore, data requiring a long recording length, such as sound data, and data requiring a short recording length such as text data can be arranged on the tracks $T_3$ to $T_6$ as desired. Each embodiment disclosed thus permits effective use of tracks for recording a greater amount of magnetic data.

Further, with the first recording track formed in a plurality of tracks such as the tracks $T_3$ to $T_6$, a greater amount of data can be recorded.

The start positions of magnetic recording in the tracks $T_3$ to $T_6$ can be arranged to be in alignment with each other in recording. In reading magnetic information, such an arrangement permits quick detection of a track in which desired magnetic information is recorded.

The tracks $T_1$ and $T_2$ which are regarded as a second track are formed in the longitudinal direction of the film 2 intermittently at positions corresponding to image recording areas of the film. With information on matters relative solely to each of the image frames recorded in these tracks $T_1$ and $T_2$, magnetic information such as a picture size correction value for image display, an exposure correction value, etc., can be quickly read out from these tracks at the time of reproducing the images recorded in the image frames of the film.

The magnetic recording density of the recording tracks $T_3$ to $T_6$ which are continuously formed from the leader part of the film to the image recording area thereof is arranged to be higher than that of the recording tracks $T_1$ and $T_2$ which are formed along one edge side of the film. This arrangement permits recording magnetic information in a still larger amount.

In a case where it is impossible to write magnetic information completely in one of the tracks $T_3$ to $T_6$ which are regarded as the first recording track, the embodiment disclosed is arranged to divide the magnetic information into a plurality of information pieces and to record the plurality of information pieces respectively in a plurality of tracks of the first track. The arrangement also permits recording a large amount of data.

According to the arrangement disclosed, an amount of magnetic data (information) writable into the first recording track of the film is compared with the amount of magnetic data (information) which is stored in a memory and desired to be written into the first recording track. If the amount of the magnetic data desired to be written and stored in the memory is found to be larger than the writable amount of data, magnetic data writing on the film is inhibited or a warning is given. Then, when the amount of magnetic data stored in the memory for writing is reduced by editing work to an amount writable into the first recording track, the magnetic data in storage is allowed to be written into the first track of the film, so that the magnetic data can be written in its entirety.

Further, in a case where the amount of data to be written in the track on the film is found to be larger than a data amount writable into the film, in recording magnetic data while the film is halfway in process of rewinding after completion of photo-taking on the film, the film is wound up toward the last frame of the film before the film rewinding and the magnetic recording are allowed to be carried on. This arrangement permits important sounds and characters to be inputted always in maximum amounts.

In writing magnetic information into the film during process of rewinding the film, in any track, among the tracks included in the first recording track, that has a relatively small amount of magnetic data which comes to terminate before it reaches a predetermined position at the leader part of the film, some dummy signal is recorded until the predetermined position is detected after the writing of the magnetic information. That arrangement ensures that the start points of all the tracks of the first recording track ($T_3$ to $T_6$) are made the same in the leader part of the film without paying heed to the writing start positions in writing magnetic information into the film.

The individual components shown in schematic or block form in the drawings are all well-known in the camera arts and their specific construction and operation are not critical to the operation or best mode for carrying out the invention.

While the invention has been described with respect to what is presently considered to be preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, the invention is applicable not only to apparatuses arranged to magnetically record or read information on or from films but also to apparatuses arranged to electronically or optically record or read information on or from films.

The software arrangement and the hardware arrangement of each of the embodiments of the invention disclosed can be replaced with each other as desired.

The invention may be carried out by combining as necessary the embodiments or their technological elements described in the foregoing.

The invention applies to cases where either the whole or a part of claims or the arrangement of each embodiment described forms one apparatus or is used in combination with some other apparatus or as a component element of an apparatus.

Further, the invention is applicable to cameras of varied kinds, such as a single-lens reflex camera, a lens-shutter type camera, a video camera, etc., optical apparatuses other than cameras, devices adapted for cameras, optical apparatuses and other apparatuses, and component elements forming these apparatuses and devices.

What is claimed is:

1. An apparatus adapted to a photographic film having a magnetic recording part, said apparatus comprising:

a magnetic recording device which continuously records magnetic information on an area of the photographic film, said area being provided with respect to each frame and inside the image recording area thereof, and a control device which performs at least one of warning and restraining recording by said magnetic recording device if an amount of information to be recorded by said magnetic recording device is larger than an amount of magnetic information which is recordable on the area of the photographic film.

2. An apparatus according to claim 1, further comprising a correcting device which corrects an amount of information to be recorded by said magnetic recording device on the area, wherein said control device cancels said warning or said restraining if the amount of information to be recorded by said magnetic recording device is corrected by said correcting device to an amount of information not larger than the amount of magnetic information which is recordable on the area.

3. An apparatus adapted to a photographic film having a magnetic recording part, said apparatus comprising:

a magnetic recording device which records magnetic information on an area of the photographic film, said area being provided with respect to each frame and inside an image recording area thereof, wherein, when said magnetic recording device performs magnetic recording during process of rewinding the photographic film, said magnetic recording device records a dummy signal if an amount of information to be recorded up to the leader part of the photographic film is absent.

* * * * *

UNITED STATES PATENT AND TRADEMARK OFFICE
CERTIFICATE OF CORRECTION

PATENT NO. : 6,400,909 B1
DATED : June 4, 2002
INVENTOR(S) : Fumio Kimura

It is certified that error appears in the above-identified patent and that said Letters Patent is hereby corrected as shown below:

Column 2,
Lines 20, 24, 31, 36, 45, 48 and 51, delete "of case" and insert -- of a case --.

Column 6,
Lines 12, 15, 52 and 55, delete "of case" and insert -- of a case --.
Line 65, delete "to be slidden" and insert -- to slide --.
Line 65, delete "gear 44" and insert -- gear 44' --.

Column 7,
Line 6, delete "of case" and insert -- of a case --.
Line 49, delete "FIG. 4(C)" and insert -- FIG. 4(C). --.

Column 11,
Line 54, delete "(last taken in" and insert -- (last taken in) --.

Column 14,
Line 29, delete "t o" and insert -- to --.

Signed and Sealed this

Twenty-first Day of October, 2003

JAMES E. ROGAN
*Director of the United States Patent and Trademark Office*